United States Patent
Amaya et al.

[11] Patent Number: 5,976,457
[45] Date of Patent: Nov. 2, 1999

[54] METHOD FOR FABRICATION OF MOLDS AND MOLD COMPONENTS

[76] Inventors: Herman E. Amaya, 129 Napier Ct., Vernon Hills, Ill. 60061; Dennis Kent Crounse, 19205 Black Oak Ct., Harvard, Ill. 60033

[21] Appl. No.: 08/914,437

[22] Filed: Aug. 19, 1997

[51] Int. Cl.[6] ............................................. B22K 3/12
[52] U.S. Cl. ............................................ 419/36; 419/37
[58] Field of Search ................................... 419/36, 37, 31

[56] References Cited

U.S. PATENT DOCUMENTS

| | | | |
|---|---|---|---|
| 4,220,190 | 9/1980 | Horton et al. | |
| 4,327,156 | 4/1982 | Dillon et al. | 428/568 |
| 5,189,781 | 3/1993 | Weiss et al. | 29/527.2 |
| 5,435,824 | 7/1995 | Dorsch et al. | 75/231 |
| 5,435,959 | 7/1995 | Williamson et al. | 264/221 |
| 5,458,825 | 10/1995 | Grolman et al. | 264/401 |
| 5,507,336 | 4/1996 | Tobin | 164/34 |
| 5,609,922 | 3/1997 | McDonald | 427/447 |
| 5,641,448 | 6/1997 | Yeung et al. | 264/401 |
| 5,680,507 | 10/1997 | Chen | 395/2.32 |

*Primary Examiner*—Daniel J. Jenkins
*Attorney, Agent, or Firm*—Law Office of Leon I. Edelson; Leon I. Edelson

[57] ABSTRACT

The present invention relates to a method for rapid fabrication of molds and mold components. This method involves first the step of producing a digital CAD representation of the mold; using this digital representation to make a set of oversized core and cavity three dimensional models, patterns or replicas, by using solid modeling technologies; placing these models, patterns or replicas respectively into a mold base with die pockets to accept the patterns; powder injection molding fine metal powders around each version of the core and cavity of the part to produce a "green" molded article having the negative or female impression or the original core and cavity patterns; debinding these "green" articles to remove the binder; sintering the debound articles to produce the final tool steel or related alloy molds; and performing secondary operations to fit then into a master mold base as part of a complete molding tool. These molds or molding dies and mold components can be used as part of a rapid prototyping mold or as permanent mold that can be used produce parts made out of plastic, metal, ceramic or composite materials. The result will be a reduction both in time and cost as compared to the construction of a standard injection molding die using established methodologies of carbon electrode grinding, electric discharge machining (EDM) and other processes.

8 Claims, 11 Drawing Sheets

METHOD FOR FABRICATION OF MOLDS AND MOLD COMPONENTS

FIELD OF THE INVENTION

This invention relates to a method for rapid fabrication of molds and mold components to be used in injection or die cast tools. More specifically, the present invention uses the powder injection molding process to form a full or near full density metal die or mold component, that is equivalent or superior in metallurgical quality to the standard tool steel mold and die components that are machined from wrought stock.

BACKGROUND OF THE INVENTION

Prior Art

An injection molding or die casting tool for a part consists generally of two opposing die insert halves—fitted in a larger frame and representing the negative version of the part that is to be produced. These two halves are known respectively as the cavity, female or convex half-representing the outer surfaces of the part; and the core, male or standing half-representing the inner details of the part. When the two halves are closed in an injection molding process, plastic or related material is molded into the cavities formed by the two halves to produce the desired part shape.

The standard method for the fabrication of a molding tool begins with the splitting of a three dimensional CAD representation into the two above mentioned cavity and core halves, and using the computer database to create a positive or male version of the parts. The positive version of the part is normally machined or ground as a set of carbon or copper electrodes for each mold half, and these set of electrodes are then used to burn a negative or female representation of the parts into a block of steel, one for the cavity half of the tool, the other for the core.

These two tooling halves can then be mounted on a standard injection molding machine to mold the actual parts from plastic, metal, ceramic or composite material formulations. Hard tooling for injection molding such as described above, is also used to produce patterns for the investment casting process as well as several powder metallurgy processes.

This process of machining a positive version of the part out of carbon material or in some cases of actually directly machining the negative or mirror image of the part into each mold half is very time consuming and expensive. Adding to the time and cost of producing the tools, is the detail work needed to incorporate water lines for cooling the mold and the fabrication of ejector pins, ejector holes and slide and wear components. Depending on the complexity and size of a tool, fabrication time can take from six weeks for a simple tool to an average of twenty-four weeks for a larger more complex tool. One application of the instant invention is to provide an alternate means to manufacture permanent tooling beyond the established technologies of machining & grinding.

An alternate means of fabricating mold cavities without using machining or grinding, has been to build the features from several different mold components. This saves time with respect to fabricating one large carbon electrode, but does require a great deal of detail work. A second application of the instant invention is then to provide a means to produce these mold components by reducing the amount of detail work needed to use them.

Because the established tooling technologies require a great deal of time and expense, a series of rapid prototyping technologies have been developed with which design engineers can evaluate form and function. The main issue is that new product designs must often undergo changes to allow all the component parts to be integrated and to function adequately and to specifications. The only way this can be done is to actually produce and assemble the parts in order to obtain the database for possible improvements and design changes. This requires either the manufacture of single prototype parts or the fabrication of rapid prototype molds that can process a series of parts. The third application of the instant invention is to provide a means to produce rapid prototype tooling.

Single prototype parts can be produced by technologies such as stereolithography, where a computer guided laser converts a liquid of a specific composition into a solid three dimensional part. Other solid modeling technologies using fundamentally the same principle, but different forming mediums, include laminated object manufacturing(LOM)—that uses fine paper to form the object, selective laser sintering(SLS)of powders, precision metal spraying and others including CNC machining of various materials The problem for single prototypes remains however, that while time is gained by skipping the construction of a hard tool; and cost reduced by obtaining parts for functional testing and evaluation, this testing is necessarily limited in scope. The prototype processes can produce only a limited number of parts, and increasing the quantities can outweigh the cost savings obtained by avoiding the construction of a hard tool. This fact highlights the importance of developing methods for the rapid fabrication of prototype tools. Many of these methods have been based on the fundamental single prototyping technologies.

For example, U.S. Pat. No. 5,458,825 describes the use of stereolithography to directly produce blow molding tooling for rapid container prototyping. This method of direct tooling, so called because a pattern is not required in the building of a mold, can produce tools of high accuracy but limited durability, so the volume runs are short. One of the issues is that the choice of materials for the stereolithographic process, referred to as SLA(stereolithography apparatus), is limited, and these materials have to be able to withstand higher molding temperatures to accommodate a wider range of plastics for sampling. Another means of duplicating the construction of the cavity and die halves of a molding tool as described in U.S. Pat. Nos. 5,435,959 and 5,580,507, involves using a prototype of the part itself inserted into a container so that the relevant features can then be engulfed by a resilient plastic material. The material is removed from that container, so that subsequently the sample itself can be separated from the resilient material leaving a cavity of that feature. The process is then repeated for the other feature to produce another mold half.

A variation of the above mentioned process uses an RTV (room temperature vulcanizing) silicone that is vacuum cast and subsequently cured around patterns generated from any of the solid modeling technologies such as SLA, SLS (selective laser sintering), LOM (laminated object manufacturing), CNC machining and others. These tools can run up to 40 prototype parts.

Variations of the above mentioned processes beginning with the 3-D CAD files, creating patterns from stereolithography or other materials and using these patterns to cast reinforced resins or plastic, are all categorized under the term "soft" tooling, due to the fact that the tooling wears out easily. "Soft" tools by definition then, can only be used as a means of rapid prototyping a limited number of parts. The short-life aspect of this tooling has been addressed by other developing technologies geared towards producing the desired "hard" tools made out of metal, and hence having more durability.

For example, a recent innovation, described in U.S. Pat. No. 5,641,448, takes the "soft" tooling produced by the any of the above mentioned solid modeling technologies, and selectively deposits layers of nickel around the inner mold surfaces. The nickel coated mold is then fitted into a base for the injection molding operation. This process does harden the tool to increase the tooling life, nonetheless, molding parameters must be controlled towards the lower end of the molding pressures to maintain the nickel deposited layers intact.

Another method of manufacture described in U.S. Pat. No. 5,189,781, takes the cavity and core patterns directly produced from stereolithography or a related solid modeling technology, and proceeds to thermal spray metal on the substrates. The next step involves the separation of the patterns from the metal substrates, leaving the cavity and core mold halves exposed. The strength of these thermally sprayed molds is a function of the thickness of the thermally sprayed metal, hence they tend to be fragile in nature.

Other methods addressed to the rapid fabrication of "hard" tools for prototype and production purposes, include the use of investment casting as described in U.S. Pat. No. 4,220,190, where the investment cast shell serves as a means to form the functional cavity surfaces when the metal alloy is cast. In a variation on this, SLA patterns are being used for the direct casting of the injection tooling molds. The main issue with this fabrication method has been the inherent surface quality of the casting and the amount of work required to bring the cast mold or die halves to specifications for use in injection molding tools.

Methods of thermal spraying of metal have been developed to directly produce prototype parts and more recently to form "hard" molds, die and tools as described in U.S. Pat. No. 5,609,922. The patterns in this case are support members constructed not only to form the desired shape of a cavity or a core, but also to promote optimum heat exchange properties for the thermal spray deposition process. The tools have the same issues of fragility as other thermal spray methods that use patterns from stereolithography as a base for the thermal spray deposition process.

Powder metallurgy has been applied towards the construction of molds and mold components due to the fact that powders can conform to the shape of any given pattern when they are flowed in. Variations in the application of the process can be identified by the way the powders are consolidated so they can maintain the desired shape. For the purposes of forming complex metal molds, the advantages of powder metallurgy lie not only in the forming of complex shapes facilitated by the flow of powders, but also by the fact that a great deal of material waste can be avoided by processing net shape or near net shape molds when compared to the other metal working processes.

A means of forming the die cavities through the use of conventional powder metallurgy is described in U.S. Pat. No. 4,327,156. The practice of this invention involves flowing in refractory powders around a flexible rubber mold that has been previously conformed from a replicating master. To keep the powders in place, a binder is mixed with the powders and molded or compressed into shape, followed by a curing period to allow the binder to harden and hold the part shape. The next step is remove the cavity or core mold, and to burn off the binder in an oven once it has accomplished its purpose, thereby leaving a porous metal skeleton that can be closed off by infiltrating a low melting point metal such as copper. This method does provide "hard" tooling that will last longer than the "soft" tooling of the other rapid prototyping technologies, and introduces the use of powder metallurgy as a means to form the "hard" tooling.

A variation of this process as described in U.S. Pat. No. 5,507,336, casts a ceramic compound over a pattern to form the cavity or core half. The procedure is to take the cavity impression on the ceramic casting and place in a tubular container so that loose metal powder can be poured into the container. Instead of binding the powders together with a binder as in U.S. Pat. No. 5,507,336, the whole tubular container is placed in an oven and a low melting metal such as copper is melted over the powder to bind the whole shape. The next step is to remove the original ceramic pattern to leave exposed the desired cavity or core mold half, which can then be assembled into a complete tool for injection molding.

Improvements have been commercially incorporated into this methodology by coating the fine metal powders by a proprietary polymer and selectively laser sintering the coated powders around a given pattern. In this case the laser serves to fuse the polymer and holds the shape of the part, thereby eliminating the need for any tubular shaped container to hold the powders together. This "green" part is subsequently impregnated with a low-melt binder system and heated in an oven before sintering at higher temperatures to provide a metal skeleton, that in the final steps is infiltrated with copper. This process is know as "Rapid tool-Long Run(LR)" and is practice by DTM Corporation in Austin, Tex.

The above mentioned approaches have addressed the issues of tool longevity by using powder metals to form "hard" metal dies. Though the resulting molds are more permanent in nature, there are two main issues which prevent these tools from being considered permanent hardened tools. The first is that the tools are difficult to polish due to the coarse nature of the base powders. This means that the surface finish on parts produced from these tools may not be adequate. The second issue is that the high copper content-necessary to close the porosity in the initial metal skeletons-reduces the attainable hardness of the composite to about Rockwell B75, which is softer that similar tools machined from aluminum. Tool life and wear resistance remains a major issue when compared to tools manufactured from conventional methods that can be hardened above Rockwell C60.

A recent application of powder metallurgy as a method for producing dies is described in U.S. Pat. No. 5,435,824. It applies hot isostatic compacting to develop a fully dense mold and die block that does not need to be copper infiltrated to achieve full density. Hot isostatic compacting consists of using a rubber container which has the general shape desired, to hold the powders together while they are compacted into shape by high pressures. The process includes removing the rubber container once the mold can hold its shape, and then heating or sintering the "green" article in a furnace to consolidate the metal powders. Several alloys can be processed from this method that can attain harnesses equivalent to those of the wrought materials commonly applied in the toolmaking process. The main issue with using this process for the construction of molds and mold components, is that the method is inherently limited in the complexity of components that it can reproduce as well as issues having to do with dimensional accuracy, since compmolds and dies occurs in molds and dies occurs in a directional basis.

Each of the above mentioned inventions has improved the development process by reducing the elements of time and cost, yet each has issues that detract from its adoption as production and extended run tools.

Those technologies that use "soft" tooling achieve only a limited number of parts for evaluation. This is due to the fact that all plastic tools made of resilient materials such as nylon and reinforced fibers tend to wear away, so that reproducibility is compromised.

When improvements are accomplished by the rapid fabrication of metal molds, these then have issues relating to surface finish that may detract from form and function evaluations on certain parts applications. In addition to this dimensional tolerances of the resulting tools may vary because the copper infiltration process causes some expansion of the mold, or the method of compaction provides a directional bias, as in hot isostatic compacting. None of the present state of the art rapid die fabrication technologies have been able to produce molding dies from a hardenable tool steel, related metal alloy or hardened material that can approach the metallurgical, surface finish quality and complexity levels of the conventional die fabrication methods.

OBJECTS AND ADVANTAGES

Accordingly, several objects and advantages of the instant invention are:

1-) To provide a method for the rapid fabrication of metal molds used in injection molding or die casting tools that can be used for prototyping or as part of a permanent mold.
2-) To provide a method using a powder injection molding as a forming step to obtain a full density or near full density metal die (near full density being defined as at least 95% of the theoretical density for the indicated metal alloy) without resorting to any copper impregnation step.
3-) To produce heat treatable metal dies from materials such as carbon steel, stainless steels, or other ferrous and non-ferrous materials that would last longer than the present state of the art "soft" tooling, thereby allowing greater flexibility in time and cost for the testing of prototype designs.
4-) To provide the capability for producing multiple cavity tool steel or related alloy metal dies in the same relative timeline used to process and produce a single cavity tool. The savings in time and cost would be substantial for high volume multi-cavity tools.
5-) To add features to the die that can facilitate fabrication and assembly. These could include water channels and coordinate referencing features, ejector locations etc., which would normally have to be machined into a conventional tool.
6-) To provide a method for the fabrication of mold components such as detailed slides and other accessories that begins with the digitized CAD drawing and ends up with a full or near full density hardened metal component.

These together with other objects and advantages of the invention will become more readily apparent to those skilled in the art when the following general statements and descriptions are read in the light of the appended drawings and claims.

BRIEF DESCRIPTION OF THE DRAWINGS

The invention will now be described in connection with the accompanying drawings, FIGS. 1–9, which include a flowchart and preferred embodiments of the invention.

DETAILED DESCRIPTION OF THE INVENTION

Figure 1:
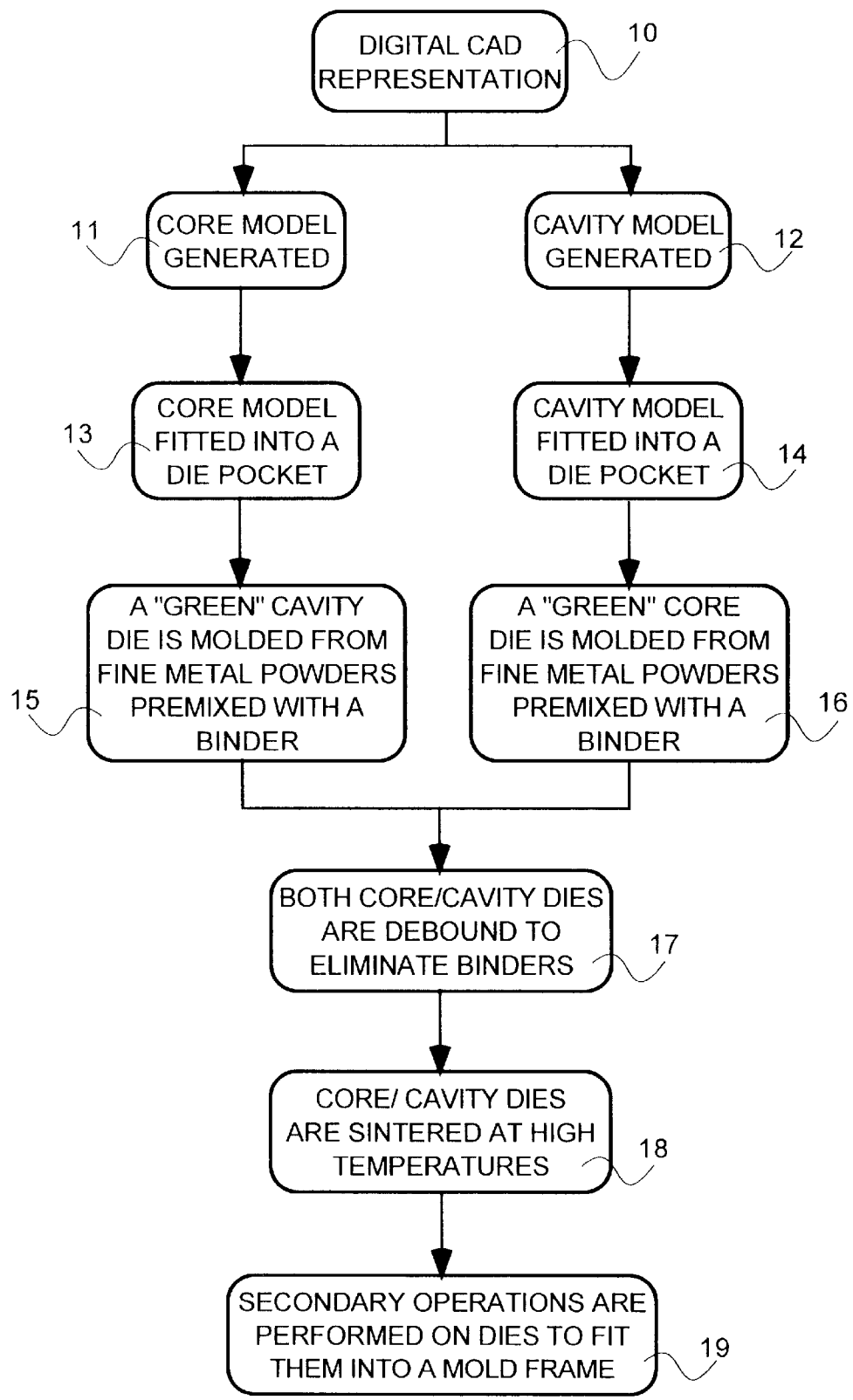
FIG. 1 is a process flow chart for the fabrication or manufacturing of hardened steel or related alloy dies and mold components.

A preferred embodiment of the instant invention is described in FIG. 1, which identifies steps 10–19 for the rapid fabrication of hardened tool steel or comparable alloy molding dies and mold components. These tools would have the added advantage of being incorporated as production tools after any key design and functional advantages were incorporated into any particular parts, hence it also addresses the time and cost factors involved in manufacturing tooling through the conventional means that have been described.

Referring again to FIG. 1, the instant invention begins with the same CAD type design database as the established fabrication processes-referenced as step 10. All of the established conventional and rapid fabrication methods start off from this same point.

One of the differences is however, that the design of the parts in the practice of the instant invention have to compensate for the shrinkage experienced during the sintering/consolidation steps. This means that the designs are made to a specific oversize shrink factor that depends on the type of alloy powder being processed, the amount of binder that is required to be mixed with the powders to obtain a moldable material, and the degree of densification the parts experience during sintering. One example, would be to use M-4 high speed tool steel powders for the formulation. These are spherical gas atomized powders produced and sieved by Anval Corporation in Sweden to a particle size less than 30 microns, and mixed with a polymer/wax binder so that the premixed material has a 94% by weight powder loading with the remaining 6% by weight being binder. Other metal powders such as carbon steel, stainless steel, copper, or bronze, will have different binder requirements depending on their size and shape characteristics, as well as the type of binder chosen by those versed in the art.

The shrink rate for the M-4 material with the powder characteristics and size as defined above, would be 1.15. This means that to obtain a desired final part size once the mold has been fully sintered, the desired final part dimensions have to be multiplied by the shrink factor to define the dimensions required of the core/cavity models. This shrink factor is easily incorporated into the CAD file drawings.

Once the digital CAD file reflects the design of the part and has been adjusted to reflect the desired shrink rate, this CAD file is used in conjunction with the creation of solid 3-D patterns through existing technologies (CNC, SLA, SLS, LOM etc.), to form the core and cavity patterns referenced in steps 11 and 12 respectively.

Stereolithography(SLA) can be used as one embodiment for the production of 3-D solid replicas, models or patterns. SLA stands for Stereolithography Apparatus produced by 3-D Systems, Inc. of Valencia, Calif. This equipment is a fully automated machine that utilizes the CAD data to guide an ultraviolet laser over a vat of photosensitive polymer. Wherever the ultraviolet light strikes the polymer, that section gets cured or solidified, hence a solid object is incrementally built up to achieve the dimensions specified by the CAD files. These core and cavity patterns are fitted into die pockets referenced in steps 13 and 1 4. The main requirement of any of the materials used for the solid modeling, is that they be able to withstand molding temperatures of at least 350°F. (185°C.) without experiencing deformation or melting.

Whichever solid modeling technology is applied towards the creation of core & cavity patterns, the key challenge is to obtain a degree of dimensional accuracy from the pattern. Because of the effect of the shrink factor described above, tolerance sloppiness on the pattern will be compounded with the resulting tolerance range of the processing itself. As a reference, the tolerance band of the solid modeling process should be set at a range of plus or minus 0.0625 mm from the nominal desired dimensions. This reference range will guide the choice of the specific solid modeling technology chosen for the overall desired precision of the final processed mold. Fine detail features may require the use of precision CNC machining, while stereolithography or other methods may be acceptable for larger dimensions.

Instead of using plastics or reinforced materials to mold around the core/cavity patterns, the instant invention injection molds fine steel or other alloy metal powders that have been premixed with appropriate binders, so that the material can be powder injection molded in a standard injection molding machine into the respective core/cavity die pockets, as shown in the steps referenced as 15 and 16.

The principles of powder injection molding revolve around the use of fine metal powders typically below 30 microns in size, that are premixed with a binder to allow the resulting material to be molded in a standard injection molding machine. The binder serves two basic purposes, that of allowing the powders to flow into a cavity in the same way as plastic is injection molded, and secondly to serve as a means to bind the powders together. Mixing of the binder and the powders is usually accomplished using a moderate to high shear mixer heated at temperatures that will fluidize the higher melting point binder constituent.

Binders in this processing technology vary according to preferences of the of those versed in the art. Thermoplastic as well as thermoset binders have been developed and successfully applied. Thermoplastic binders are widely used and consist of the use of polymers such as polypropylene and polyethylene, that are mixed with lower melting point, short chain, low molecular weight waxes. It is common to add plasticizing or coupling agents to the polymer/wax binder, such as stearic acid, glycerol, elastomers, titanates, fatty acids and other known agents that serve to lower the viscosity of the overall mix. In this practice, the polymer portion of the binder serves as the binding agent, while the wax and plasticizers lower the viscosity of the overall material to allow it to be molded. A typical composition of binder used to mold the previously referenced M-4 tool steel material, is a high melting point polypropylene polymer, a low melting point paraffin wax, and a coupling agent such as stearic acid After molding, the result will be "green" die blocks ("green" being defined as a part consisting of metal powders plus binder that have not been sintered or consolidated by heat) having the negative or female impression of the cavity/core patterns. The typical green density of an M-4 tool steel mold varies from 5.2 g/cc to 5.4 g/cc, which reflects the packing of the powders plus the binder. After sintering, as will described following, the density increases to approximately 8.0 g/cc. This change in densities is what accounts for the large shrink rate of at least 15% (1.15 shrink factor) for the M-4 tool steel material.

The green articles are then processed further through a debinding stage as represented in step 17. The purpose of the debinding stage is to progressively remove the binder. Thermoplastic binders are generally composed of a polymer/wax combination, therefore, the debinding process would consist of a step to remove the wax, followed by a step to remove the polymer. Removal of the wax allow channels to be formed in the molded part, which will permit the subsequent evaporation of the polymer constituent. Other debinding processes go through a step to eliminate a low melting point constituent, followed by the removal of a high melting point constituent using thermal, chemical or similar means.

In the example for an M-4 tool steel molded material as described previously, the wax can be eliminated using a heated solvent, such as trichloroehtylene, in liquid or vapor form. This would be followed by the removal of the remaining polymer in an inert atmosphere furnace, thereby producing a debound mold or part consisting only of the metal powders.

This debound part will continue to hold its shape due to the fact that the elimination of the polymer portion of the binder, will also allow the powders to presinter or weld together. A continues belt furnace with multiple heating zones can be used for this purpose. The first zones would be set a temperature that would eliminate the binder without creating soot deposition on the parts, followed by zones of progressively higher temperatures, which would then presinter the metal powders.

The debound mold is finally put through a sintering or high temperature consolidation step 18, to produce the final near full density mold article. The sintering step 18, can be carried out in any high temperature vacuum or atmosphere furnace. To process M-4 tool steel in the reference example, the preferred mode of sintering would be in a vacuum furnace at a maximum temperature of 2240°F.(1220°C.) for 10 minutes. This will yield a mold or die with a sintered density of approximately 8.0 g/cc, which is about 99% of the theoretical density of 8.1 g/cc. In achieving this high density, the part will have shrunk as noted approximately 15% from the green molded state. Different materials such as carbon steel, bronze, copper or stainless steel, will have different sintering temperatures and hence different shrink rates.

The goal of the sintering operation is to obtain the highest density possible, preferably approaching near full density, defined to be above 95% of the theoretical density for the material. The motivation for this is to obtain metallurgical integrity as well as properties approaching those of wrought materials. There are situations however, where slightly lower densities, as for example from 90–95% of theoretical, may be acceptable and in fact advantageous towards obtaining improved dimensional accuracy of the molds.

The high shrink rates observed for powder injection molded parts in general, emphasizes the application towards smaller intricate shaped molds and mold components. Generally speaking, the larger the cavity/core features, the greater the dimensional spread obtained in the final sintered and processed parts. Dimensional requirements and economics will dictate the application of the method towards larger sized mold components in excess of 2" linear dimension.

The sintered mold or die can be finished by any number of secondary operations and fitted into an injection molding frame in the final step 19. Secondary operations can include heat treating, polishing, electropolishing to remove material to meet target dimensions, and the addition of slide, ejection pins, and other mold accessories that will create a functional mold tool for injection molding any materials.

For the case of molds sintered to slightly lower densities, one secondary operation could include the resin impregnation of the mold to close off surface pores. This process consists of impregnating a curable or hardenable polymer resin into the surface pores of the mold, accomplishing the same objectives as copper impregnation, without taking the parts up to high temperatures to melt the copper.

FIGS. 2–11 expand and exemplify the results of the process steps outlined in the overall flow diagram shown in FIG. 1.

Figure 2A:
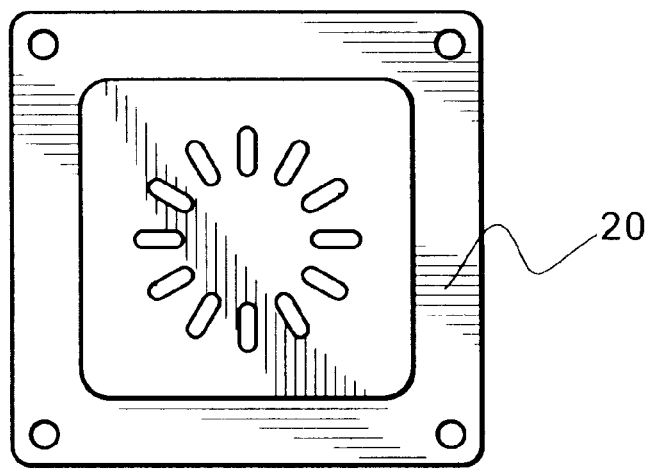
FIGS. 2-*a* to 2-*b* show a representative 3-D CAD drawing of a part with a view of the core or interior features of the part, and the cavity or external features of the part.
Figure 2B:
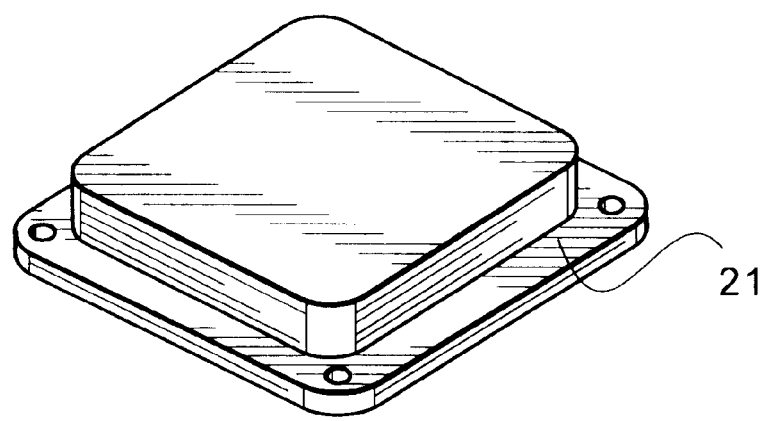

A representation of a 3-D CAD file drawing is shown in FIGS. 2-*a* & 2-*b*. The goal at this stage of the process is to split the part into two corresponding halves, the interior or core 20 half shown in FIG. 2-*a*, and an exterior or cavity 21 half shown in FIG. 2-*b*. These core 20 and cavity 21 representations will form the basis for the design and manufacture of the mold cavity/core patterns, which will be the mirror images of the CAD representations.

Once the split of the part has been defined, it is now possible to use the same database to generate a cavity/core sets of CAD representations, which are the inverse of the original representations shown in FIG. 2. As described previously in the example of using stereolithography, the CAD database guides the process, where a laser gun is guided by the computer to scan a special photopolymer and cure selected areas to produce the desired shape or pattern. Conventional CNC machines use this same database to selectively cut steel to predetermined shapes.

Figure 3A:
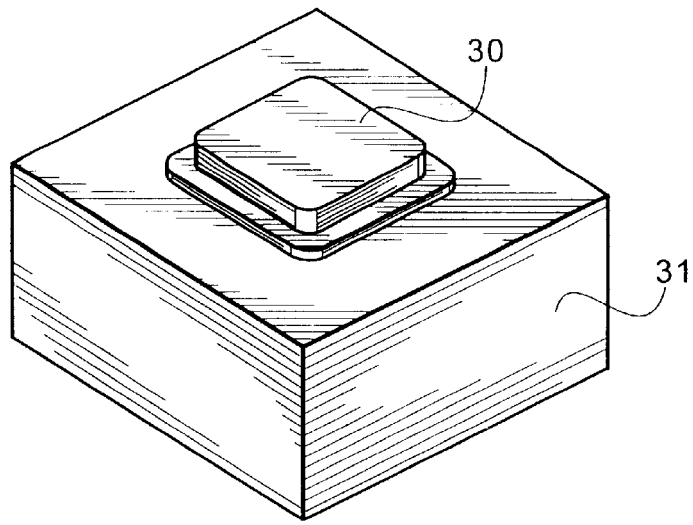
FIGS. 3-*a* to 3-*b* show a core pattern generated by any of the 3-D modeling technologies and how it is assembled into a set of master insert molds containing the core pattern..
Figure 3B:
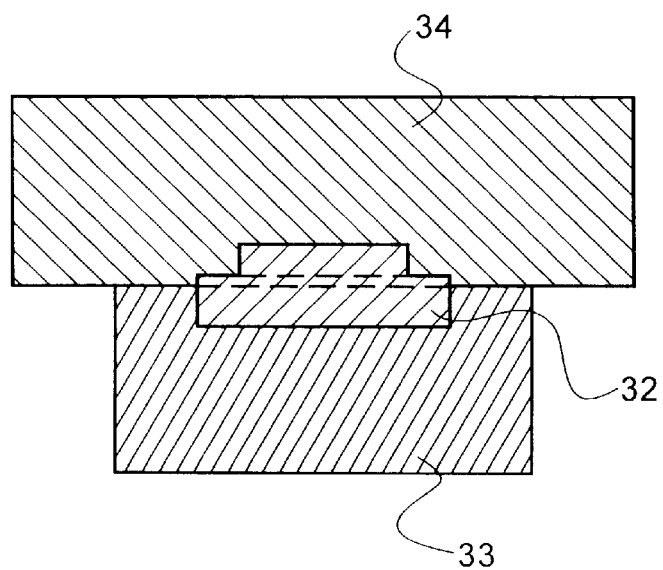

A preferred embodiment of the resulting core pattern 30 represented in FIG. 3-*a*, is that it has a base 31 whose purpose is to hold the core 30 stable when the pattern is fitted into a die pocket of a master insert mold. The actual dimensions of the base 31 depend on the size of the part being replicated, as the die pocket can be easily varied to allow the base to fit in.

Standard mold bases may be used to assemble the core/cavity sets, however, this process may be facilitated by the use of modular interchangeable mold systems provides flexibility. These modular designs allow the use of one basic mold frame that can accept various master insert mold sets. By definition, each set of master mold inserts will have a cavity insert and a corresponding core insert half.

These master mold inserts are the ones that will have the pockets machined into them that can accept the patterns, as well as the fully processed cavity and core die half sets. Examples of modular frames that can be used for the stated purposes are the Master Unit Die Quick-Change Systems of Greenville, Mich. or Roundmate Systems from Kenton, Ohio.

The assembled master mold inserts used to powder injection mold the cavity half of the molding die is shown in FIG. 3-*b*. The core pattern 30 has been fitted into a core die pocket 32, which is part of a core master insert mold 33, that is matched with a complementary cavity master insert 34.

Figure 4A:
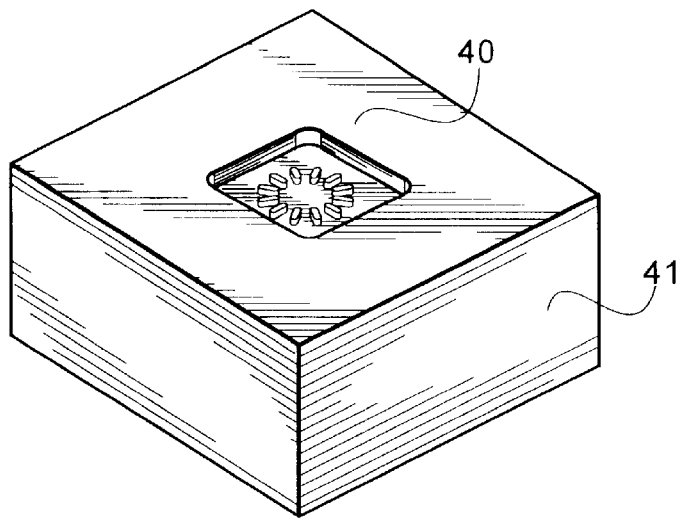
FIGS. 4-*a* to 4-*b* show a cavity pattern generated by any of the 3-D modeling technologies and how it is assembled into a set of master insert molds containing the cavity pattern.
Figure 4B:
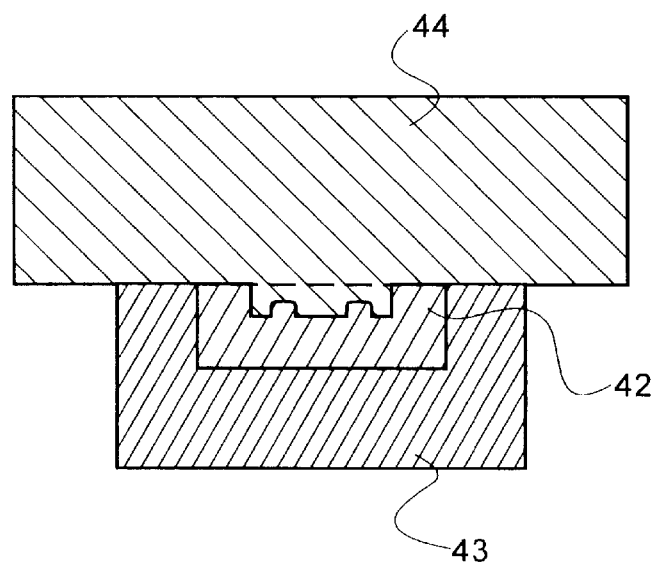

The cavity pattern 40 shown in FIG. 4-*a* shows the same preferred embodiment feature of base 41 supporting the cavity pattern 40.

FIG. 4-*b* shows the assembled master insert molds used to powder injection mold the core half of the molding die. The cavity pattern 40 has been fitted into a cavity die pocket 42, which is part of the cavity master insert 43, that is matched with a core master insert 44.

The result of each of the molding processes are two respective "green" parts. The set of assembled insert molds of FIG. 3-*b*, containing the core pattern 30, will produce the negative image of itself to become the "green" cavity die half. In like manner, the insert molds of FIG. 4-*b*, that contain the cavity pattern 40, will produce the corresponding "green" core die half.

Figure 5A:
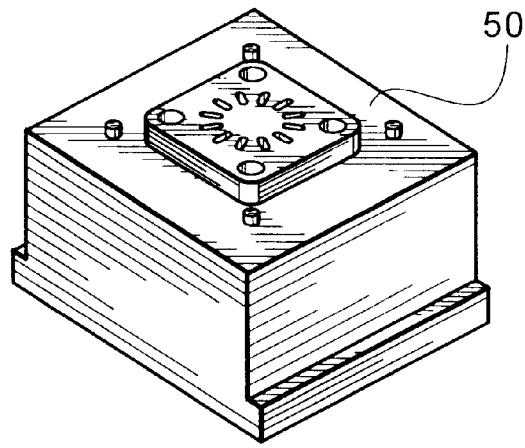
FIGS. 5-*a* to 5-*b* show a sintered and finished core mold die in conjunction with the master insert mold and die pocket, where it will be fitted into.
Figure 5B:
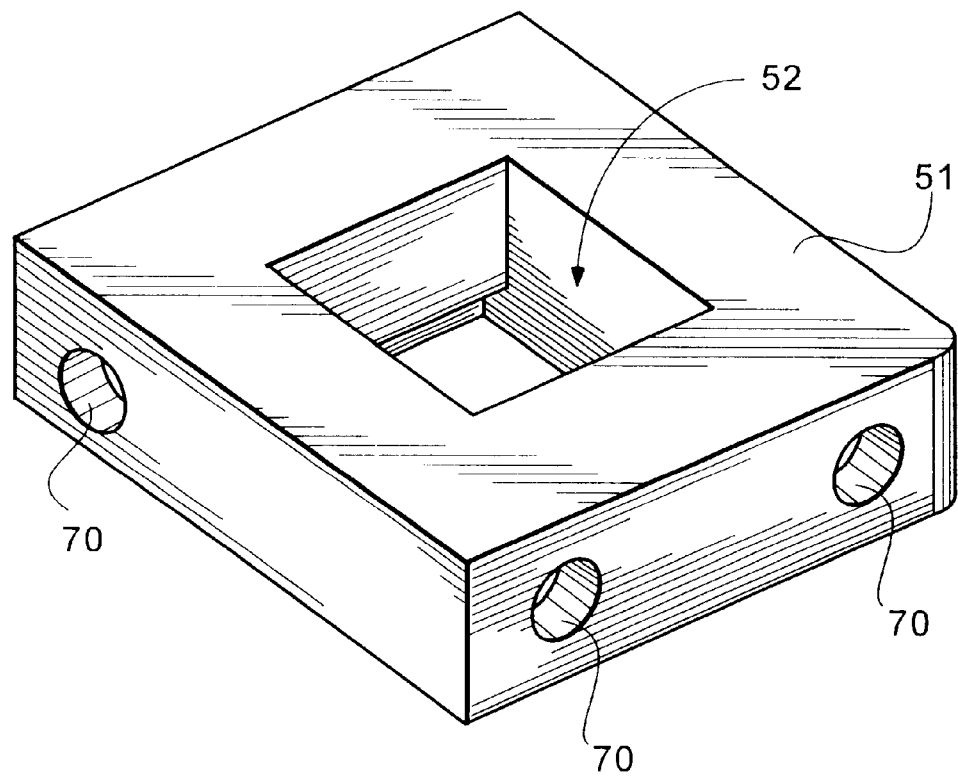

The fully processed and finished cavity die 50 is shown in FIG. 5-*a*. Also shown is a view of the insert mold 51 in FIG. 5-*b* with the die pocket 52 that will accept the cavity die 50. This cavity die 50 will undergo a number of secondary operations that will include heat treating to harden the metal, and grinding and polishing, to assure a tight fit in the die pocket 52. Also identified are the water cooling channels 70, that are typically found in all production injection molds.

Figure 6A:
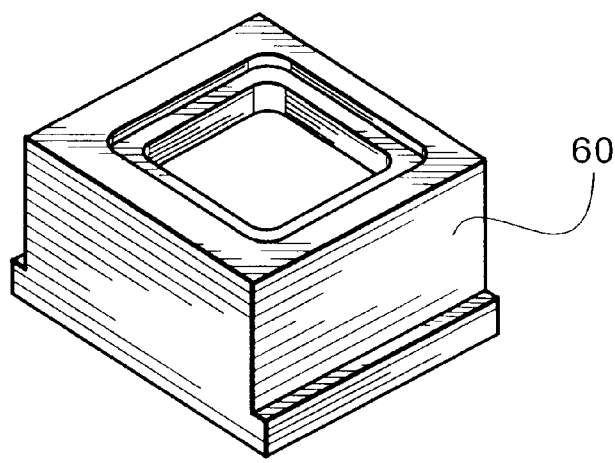
FIGS. 6-*a* to 6-*b* show the sintered and finished cavity mold die in conjunction with the master insert mold and die pocket, where it will be fitted into.
Figure 6B:
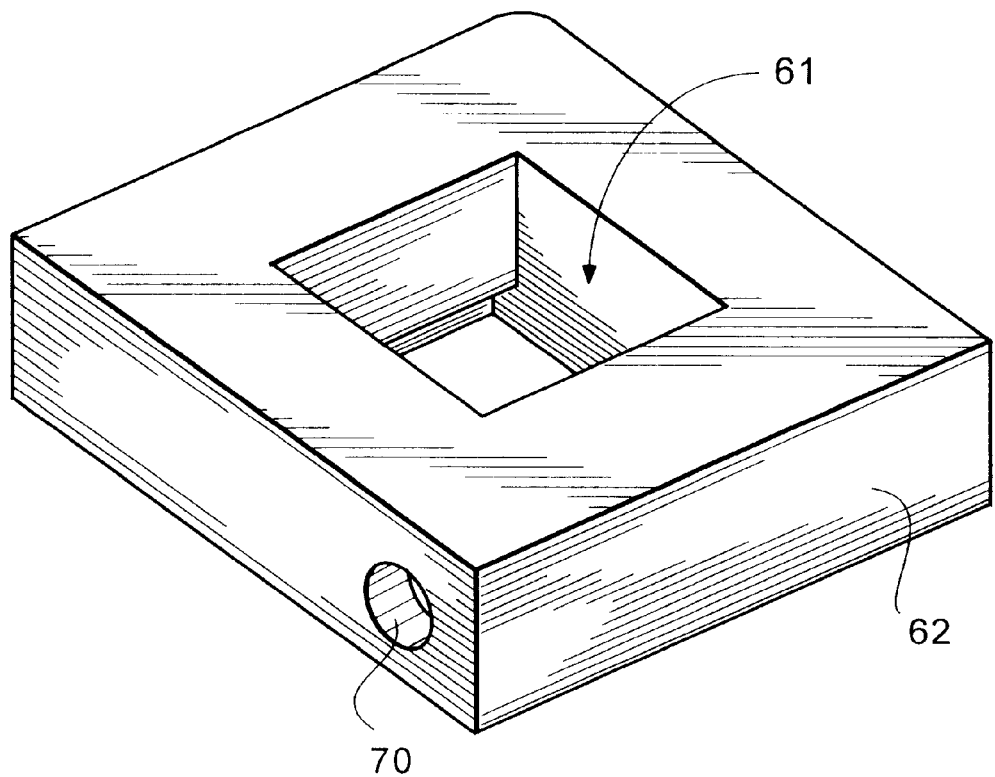

FIG. 6-*a* shows the complementary view of the fully processed and finished core die 60. This die is fitted into the die pocket 61 of the corresponding insert mold 62 shown in FIG. 6-*b*. The core die 60 will require the same secondary operations as the cavity die 50.

Figure 7A:
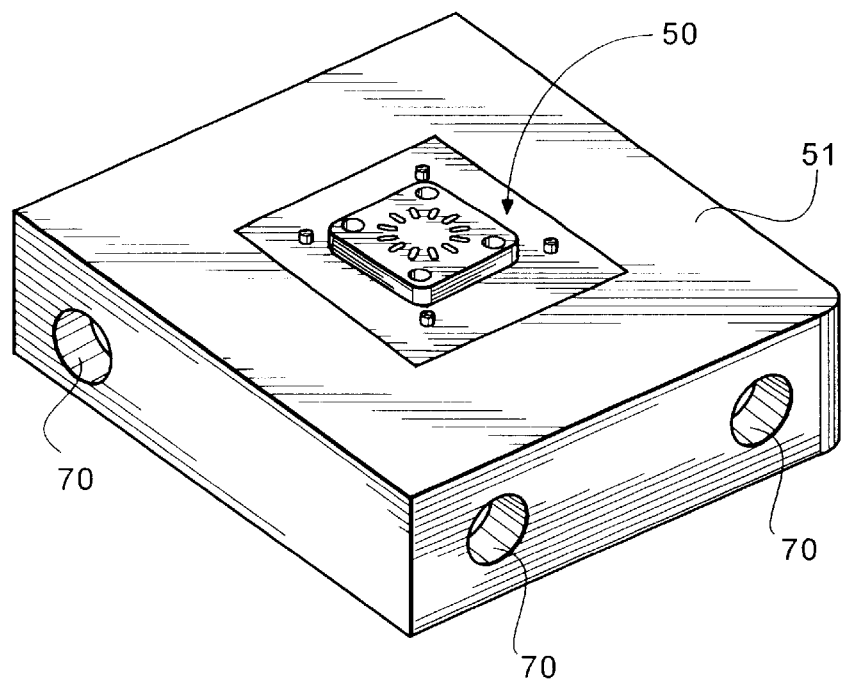
FIGS. 7-*a* to 7-*b* show the fully fitted core and cavity mold dies in their respective master insert molds.
Figure 7B:
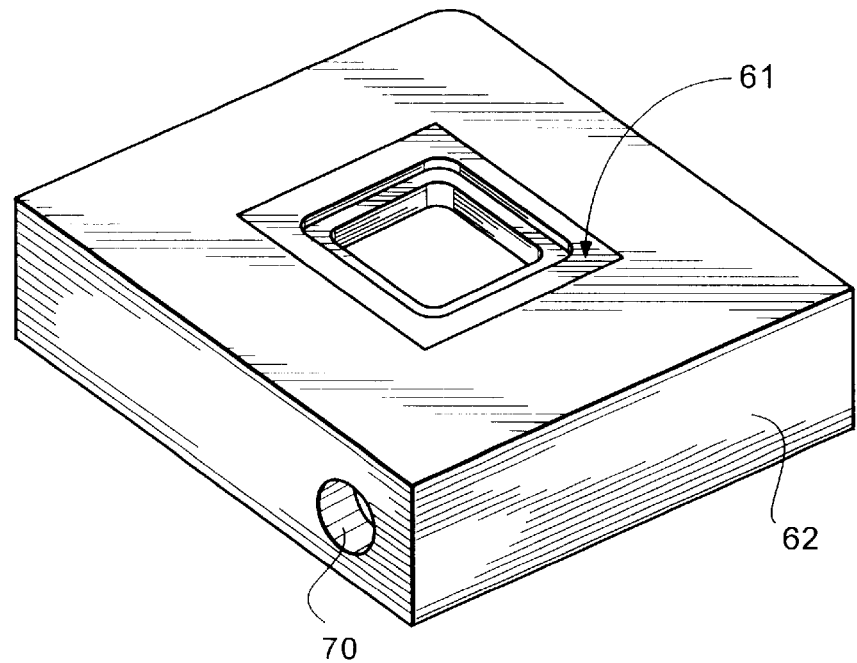

FIG. 7-*a* & 7-*b* are views of the assembled core 50 and cavity 60 dies in their respective mold inserts. To be noted is that these inserts have included water lines 70 for cooling the molds. Since the die sets will have been fully hardened, one of the primary advantages will be the durability of the tool to produce sample parts beyond the norm of 30–40 parts in prototype tooling. Closely tied in to this is the time of fabrication, which is comparable to the time used to produce the plastic tools as well as the dimensional precision obtained with this process.

Figure 8:
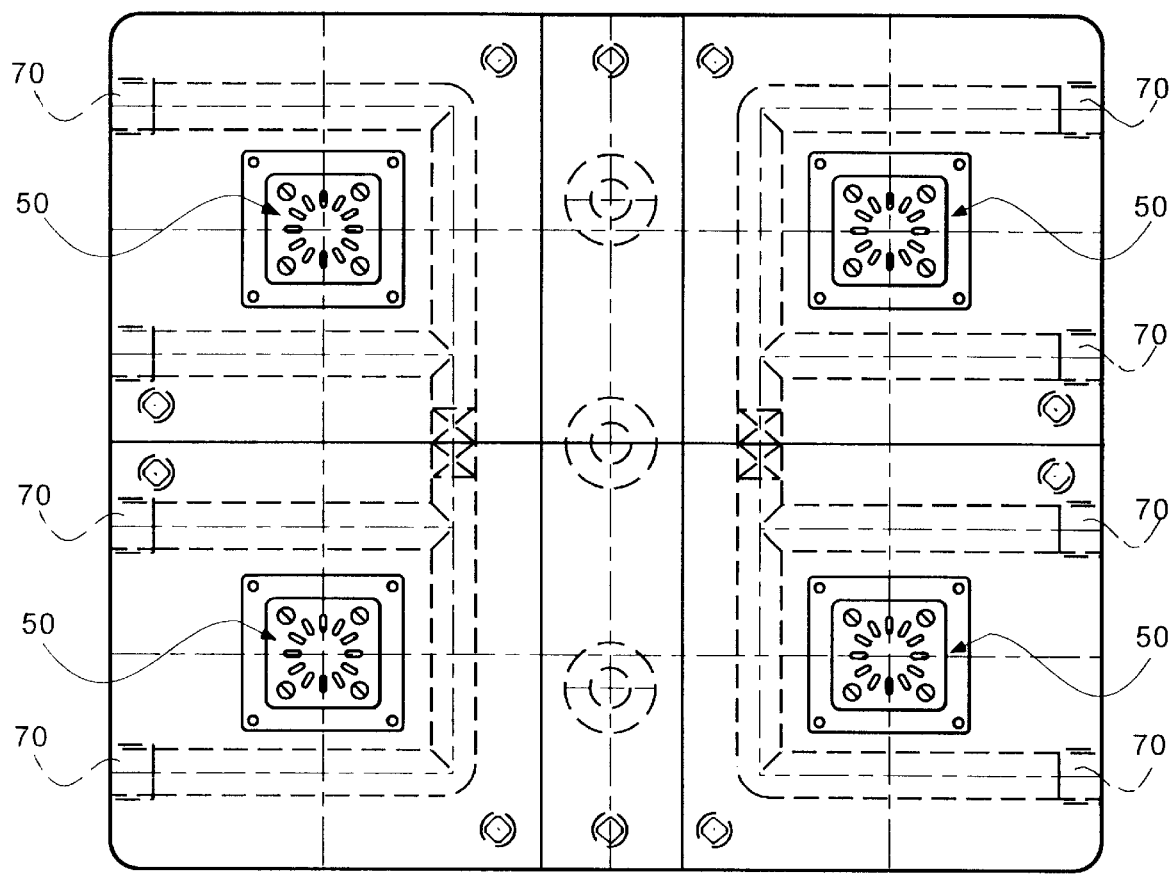
FIG. 8 shows the cavity half of a multi-cavity molding die.
Figure 9:
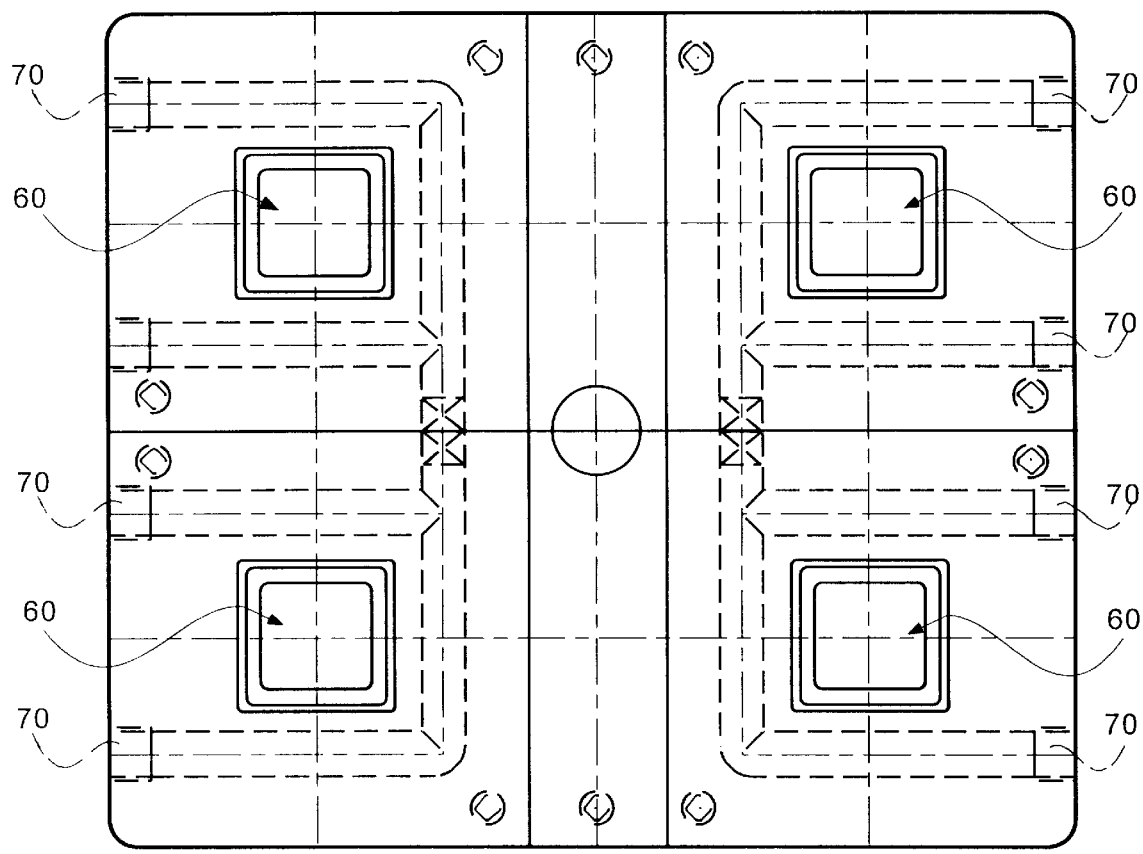
FIG. 9 shows the core half of a multi-cavity molding die.

The major advantage, however, is that this method of manufacture can yield, with a finalized part design, a fully production ready multi-cavity tool at a fraction of the time and cost to produce a comparable tool using carbon electrodes, CNC machining and other standard tooling practices. In this case all that would be required are a set of mold inserts with multiple pockets to accept the respective core 50 and cavity 60 dies as shown in FIGS. 8 and 9. More specifically, FIG. 8 details the core half of the tool with the multiple core cavities, while FIG. 9 shows the complementary cavity half with the multiple cavity dies.

This time and cost advantage becomes even greater for small and medium sized intricately shaped components, that would require a great deal of detail work to complete. Examples of this would be molds for medical, orthodontic, electrical, terminal board and other appliances that have fine detail features.

The same process, detailed in FIG. 1, used to produce fully hardened core and cavity metal dies, can also be used to produce mold components. Mold components can be any part or accessory used in a molding die, such as for example slides and wear plates. There are applications where the core and cavity features for a molding tool are formed by a multiple array of individual mold components, that together formed the desired features that are to be reproduced on the molded part. The main reason for approaching the toolmaking process in this manner, is to save time and cost on the machining of an intricate electrode.

Figure 10A:
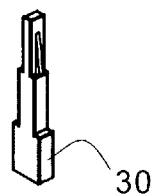
FIGS. 10-*a* to 10-*c* show an example of a mold component that is produced from two core and cavity die half patterns manufactured by any of the solid modeling technologies.
Figure 10B:
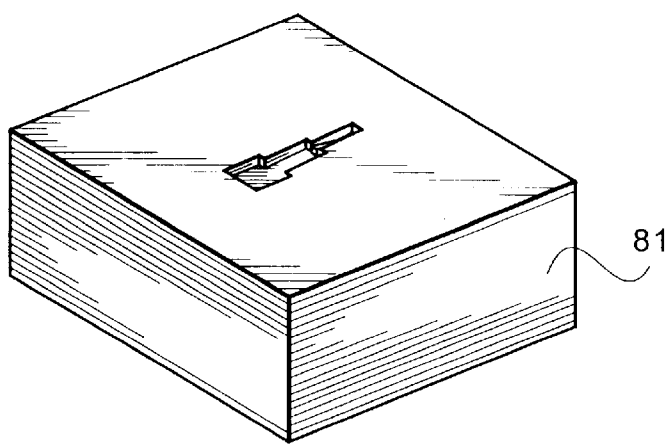
Figure 10C:
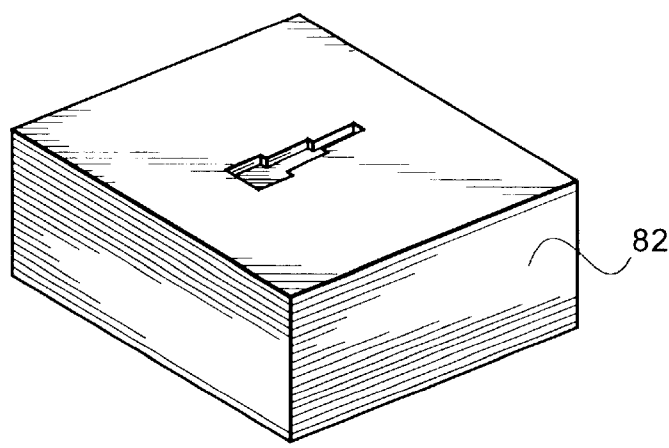
Figure 11A:
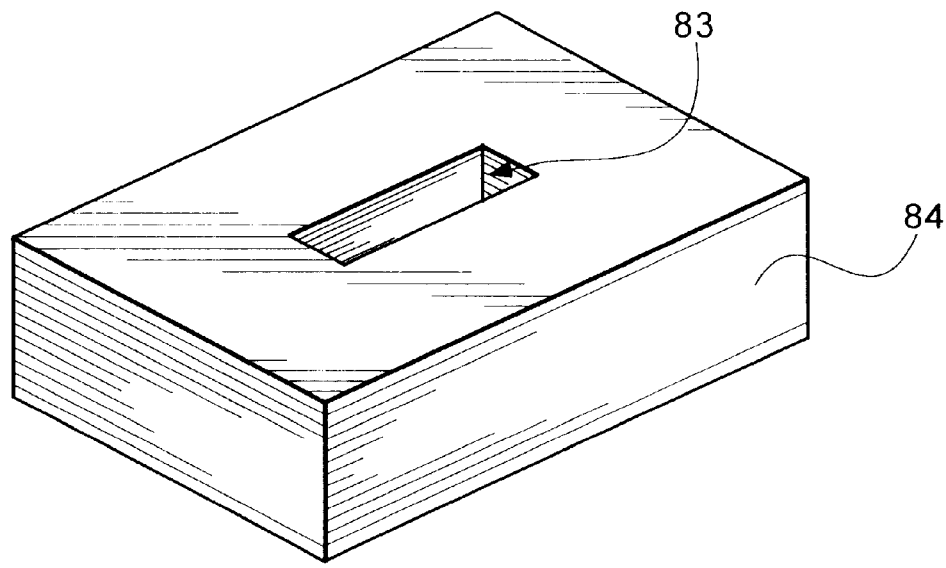
FIGS. 11-*a* to 11-*b* shows the mold component fitted along with several other components into a die pocket to form a desired part feature.
Figure 11B:
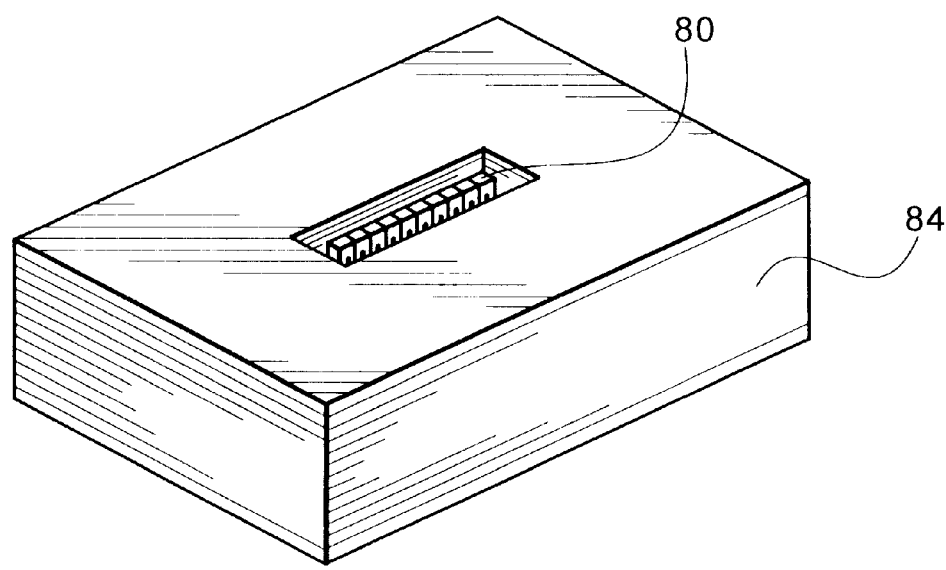

An example of a mold component used in this fashion is shown in Fig.10-*a*, with a view of the component 80 and the core 81 and cavity 82 patterns that are used to form it, as shown in FIGS. 10-*b* & 10-*c* respectively. Once the components 80 are fully processed, they can be inserted into a die pocket 83 as shown in FIG. 11-*a*, to form the desired feature or shape shown in FIG. 11-*b*. A variety of configurations and designs can be processed and assembled in this manner to provide flexibility in the toolmaking process.

We claim:

1. A method of fabricating molds and mold components comprising the steps of:
    a.) creating a cavity and core patterns of a mold;
    b.) powder molding a metal alloy material comprising metal powders and binder around each version of the cavity and core pattern, thereby forming a corresponding die block part as a green article wherein said metal powders and binder of said green article are not sintered or consolidated by heat;
    c.) processing said green article to consolidate the metal powders including a means for debinding said binder of said metal alloy material and forming a sintered metal mold;
    d.) finishing said sintered metal mold to fit into a mold base or master mold insert for molding of metals, ceramics, or plastics.

2. The method of claim 1 wherein the powder molding material used to produce these molds is selected from the group of tool steels, carbon steels, stainless steels and other ferrous powders & alloys that can be processed to near full density and heat treated.

3. The method of claim 1 wherein the powder molding material used to produce the molds is from any non-ferrous powder such as copper and bronze, that can be processed to near full density.

4. The method of claim 1 wherein the molds include features such as coordinate reference points, ejector hole locations or other similar objects that aid, or result in the reduction of, any secondary processing and finishing operations.

5. The method of claim 1, wherein the resulting mold die could be incorporated into a mold base used for the die casting of materials such as aluminum and zinc.

6. The method of claim 1, wherein the powder molding materials are processed and sintered to densities lower that 95% of theoretical.

7. The method of claim 6, wherein the sintered molds are resin impregnated to close off the surface pores.

8. The method of claim 6, wherein powders coarser than the norm of −30 microns in size, are used to prepare the powder molding material.

\* \* \* \* \*